US010411958B2

(12) United States Patent
Nolan et al.

(10) Patent No.: US 10,411,958 B2
(45) Date of Patent: Sep. 10, 2019

(54) AUTOMATIC DEVICE CONFIGURATION

(71) Applicant: Intel Corporation, Santa Clara, CA (US)

(72) Inventors: Keith Nolan, Mullingar (IE); Mark Kelly, Dublin (IE); Hugh Carr, County Wicklow (IE)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 14/479,789

(22) Filed: Sep. 8, 2014

(65) Prior Publication Data

US 2016/0072674 A1    Mar. 10, 2016

(51) Int. Cl.
H04W 4/50 (2018.01)
G06F 11/00 (2006.01)
H04L 12/24 (2006.01)

(52) U.S. Cl.
CPC .......... *H04L 41/0813* (2013.01); *G06F 11/00* (2013.01); *H04L 41/0816* (2013.01);
(Continued)

(58) Field of Classification Search
CPC ............ H04L 41/0813; H04L 41/0816; H04L 41/5025; H04L 41/0893; H04L 67/125;
(Continued)

(56) References Cited

U.S. PATENT DOCUMENTS 8,848,608 B1 * 9/2014 Addepalli ............. H04W 4/046
370/328
2004/0009751 A1 1/2004 Michaelis et al.
(Continued)

FOREIGN PATENT DOCUMENTS

CN   1505325    6/2004
CN   101006703  7/2007
(Continued)

OTHER PUBLICATIONS

"International Application Serial No. PCT/US2015/048164, International Search Report dated Jan. 25, 2016", 3 pgs.
(Continued)

*Primary Examiner* — Sargon N Nano
*Assistant Examiner* — Tania M Pena-Santana
(74) *Attorney, Agent, or Firm* — Schwegman Lundberg & Woessner, P.A.

(57) ABSTRACT

Various systems and methods for automatic device configuration are described herein. A system for automatic device configuration comprises a performance monitor module to monitor, at a computing device, performance of the computing device during a period while the computing device communicates on a network using a current network interface of the computing device, a policy enforcement module to compare the performance of the computing device during the period with a performance policy installed on the computing device, and determine that the performance violates a threshold, the threshold provided in the performance policy. The system also includes a network configuration module to reconfigure a network configuration in response to the determining that the performance violates the threshold by disabling the current network interface and enabling a replacement network interface from a plurality of network interfaces available on the computing device.

23 Claims, 8 Drawing Sheets

(52) U.S. Cl.
CPC ...... *H04L 41/0893* (2013.01); *H04L 41/5025* (2013.01); *H04W 4/50* (2018.02); *Y04S 40/162* (2013.01)

(58) Field of Classification Search
CPC .... H04L 67/303; H04L 43/0888; G06F 11/00; H04W 4/001
See application file for complete search history.

(56) References Cited

U.S. PATENT DOCUMENTS

| | | | |
|---|---|---|---|
| 2005/0239443 | A1 | 10/2005 | Watanabe et al. |
| 2006/0072583 | A1 | 4/2006 | Sanda et al. |
| 2007/0058655 | A1 | 3/2007 | Myers |
| 2008/0162452 | A1 | 7/2008 | Cox et al. |
| 2008/0288620 | A1* | 11/2008 | Goff ................ G06F 3/061 709/223 |
| 2009/0310509 | A1* | 12/2009 | Kumai ............... H04W 48/18 370/254 |
| 2011/0208984 | A1* | 8/2011 | Naware ........... H04W 52/0229 713/320 |
| 2012/0140651 | A1* | 6/2012 | Nicoara ............. H04W 48/18 370/252 |
| 2013/0041981 | A1* | 2/2013 | Kim ................. H04W 48/16 709/217 |
| 2013/0051247 | A1 | 2/2013 | Reese et al. |

FOREIGN PATENT DOCUMENTS

| | | |
|---|---|---|
| CN | 102893675 | 1/2013 |
| CN | 105580475 | 12/2018 |
| EP | 2461631 | 6/2012 |
| TW | 201002121 A | 1/2010 |
| TW | 201613383 A | 4/2016 |
| TW | I620452 | 4/2018 |
| WO | 2004008793 | 1/2004 |
| WO | WO-2016040073 A1 | 3/2016 |

OTHER PUBLICATIONS

"International Application Serial No. PCT/US2015/048164, Written Opinion dated Jan. 25, 2016", 5 pgs.

Matsushita, Yosuke, "Graceful Degradation of Transport Layer in Mobile Internet", Wired/Wireless Internet Communications: Lecture Notes in Computer Science, vol. 2957, Springer Science & Business Media, (2004), 120-132.

Passas, Nikos, et al., "A graceful degradation method for congestion control in wireless personal communication networks", IEEE 46th Mobile Technology for the Human Race Vehicular Technology Conference, vol. 1, (1996), 126-130.

"International Application Serial No. PCT/US2015/048164, International Preliminary Report on Patentability dated Mar. 23, 2017", 8 pgs.

"Taiwanese Application Serial No. 104125085, Office Action dated Aug. 22, 2016", w/English Claims, 14 pgs.

"Taiwanese Application Serial No. 104125085, Response filed Feb. 21, 2017 to Office Action dated Aug. 22, 2016", w/English Claims, 47 pgs.

"European Application Serial No. 15839788.5, Extended European Search Report dated Mar. 12, 2018", 7 pgs.

"European Application Serial No. 15839788.5, Response filed May 27, 2019 to Communication Pursuant to Article 94(3) EPC dated Jan. 15, 2019", 13 pgs.

"Chinese Application Serial No. 201580042260.8, Office Action dated Jun. 4, 2019", w English translation, 35 pgs.

* cited by examiner

| DATA RATE: 20Mbs |
| LATENCY: <10ms |
| DUTY CYCLE: 50% |
| POWER DISSIPATION LIMIT: 4W |
| TIME: 0800-1759 |

602

| DATA RATE: 20kbps |
| LATENCY: <5000ms |
| DUTY CYCLE: 10% |
| POWER DISSIPATION LIMIT: 25mW |
| TIME: 1800-0759 |

AUTOMATIC DEVICE CONFIGURATION

TECHNICAL FIELD

Embodiments described herein generally relate to deployed devices and in particular, to automatic device configuration.

BACKGROUND

The Internet of Things (IoT) is a network of objects that may be accessible through a network, such as the Internet. These objects may include embedded or auxiliary systems to monitor the state of the objects and provide state information to other objects in the IoT. Many concerns and obstacles are brought forth because of the near-complete connectivity provided by such a model. Security breaches may become more costly or expose more sensitive data, or unreliable systems may cause economic or social costs when the systems are most needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The technology discussed in this disclosure relates to wireless communication devices and networks predominately in the Internet of Things (IoT) domain, but is also applicable to remotely deployed devices employing wireless communications that may be power-constrained or are designed to operate without human intervention. The systems and methods discussed herein are designed to work with a wide range of network communications standards and protocols. These may include the IEEE 802.11 family of Wi-Fi® standards (e.g., IEEE 802.11 abgn, 802.11 af, IEEE 802.11 ac), cellular network standards (2G, 3G, 4G LTE, 4G LTE-A, etc.), long range networking (IEEE 802.22, WEIGHTLESS), mesh networking (IEEE 802.15.4, ZigBee®, Z-Wave®), and Bluetooth®. The systems and methods discussed herein are suitable for deployment in IoT use cases and for remote networks where device resources may be constrained, e.g., devices relying on battery power alone or via harvested energy. Additionally, the systems and methods discussed herein are designed to operate with commercial off-the-shelf standardized communications devices without significant modification.

The IoT encompasses "things," which may include people or animals with embedded or wearable systems, automobiles, cameras, furniture, household appliances, utility meters, or any other natural or man-made object that has or may be assigned a network address (e.g., an IP address) and be able to transfer data over a network. The IoT has evolved from the convergence of wireless technologies, micro-electromechanical systems (MEMS), and the Internet, enabled with faster processors, more efficient batteries, and more ubiquitous network availability.

Devices deployed in the IoT are becoming increasingly common Deployed devices may have to deal with various operational and environmental constraints, such as battery power, weather, or network availability. Devices are typically unable to modify their own operational behavior as their resources become depleted or damaged over time, preventing the devices from continuing to meet their initial deployment objectives. Alternatively, when additional resources become available, devices are typically unable to expand their functionality or abilities to use the additional resources.

A key problem is how to maximize the operating lifetime of a power-constrained wireless communication device. The operating lifetime may be affected by various factors, such as battery performance or environmental effects on the battery or other systems. Wireless communication interfaces have varying power dissipation characteristics and may represent a significant portion of the device's energy budget. For example, a cellular 3G model may burst up to 2 W of transmission power for a relatively short period of time (e.g., hours), whereas mesh networking devices may operate at milliwatt levels with lower duty cycles over a period that may be measured in years.

Further, devices are typically unable to autonomously modify their behavior in response to depletion in available device resources. Also, devices do not typically support a method to be remotely reconfigured and re-tasked by a network controller. Ultimately, conventional devices with multiple wireless interfaces are unable to choose the most suitable wireless interface that will best suit the required communications task yet maximize the operating lifetime of the device in a power-constrained context. Moreover, conventional multi-interface devices are unable to dynamically switch to an alternative wireless interface with a reduced power demand as the battery power becomes depleted.

Systems described herein monitor the available resources in a device that has multiple network interface options and dynamically changes the active network interface to best meet the objectives of a device policy. The systems enable policies to be defined that allow a device to perform and provide a service to be optimized and dynamically adapted to address resource constraints. Thus, for example, a policy may be defined that directs a device to take an action to maintain a level of service when a resource constraint threshold is encountered. For example, when the available device power becomes unable to support a particular network communications protocol or interface, an alternative network interface is chosen that operates with the available power.

One of the most important resources is available power. By dynamically switching between available network interfaces based on their power dissipation requirements to best suit the available device power and communications requirements, the operating lifetime of the device may be extended.

Degradation is used in this disclosure to refer to stepping down in network capabilities, such as by using a network protocol that reduces network throughput, increases network latency, or the like. In contrast, augmentation is used to refer to increasing the capabilities of a device by switching to a more capable network interface or protocol, which supports greater network throughput, has less latency, or the like, but may require more resource consumption (e.g., power dissipation).

Figure 1:
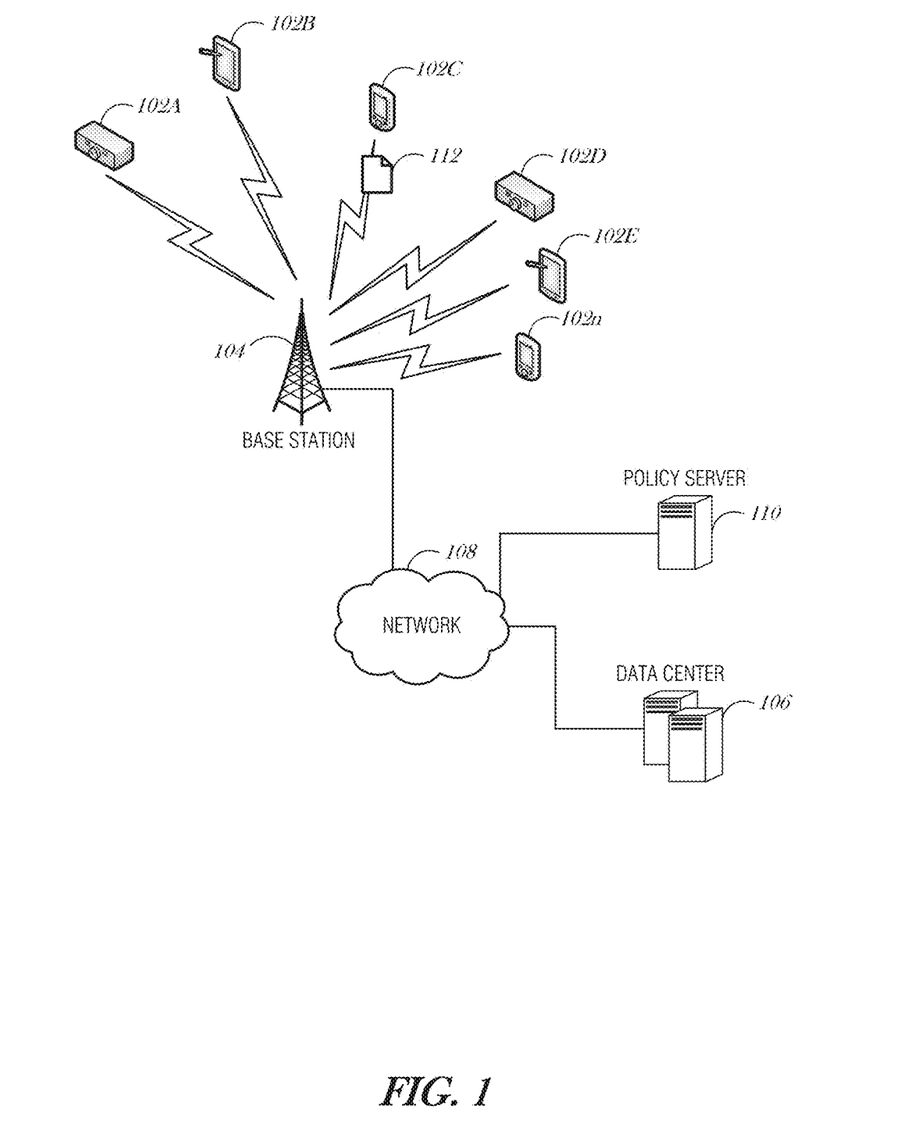
FIG. 1 is a schematic drawing illustrating a networked system, according to an embodiment.

FIG. 1 is a schematic drawing illustrating a networked system 100, according to an embodiment. The networked system 100 includes a plurality of network addressable devices 102A, 102B, . . . , 102n (herein referred to as 102) (e.g., clients), each having multiple network interfaces available. The network interfaces may be for wired or wireless protocols, including but not limited to Ethernet, IEEE 802.11 family of Wi-Fi standards (IEEE 802.11a/b/g/n, 802.11 a/f, IEEE 802.11 a/c), cellular networks (2G, 3G, 4G LTE, 5G), long range networking (IEEE 802.22, WEIGHT-LESS), mesh networking (IEEE 802.15.4, ZigBee®, Z-Wave®), and Bluetooth®. The network addressable devices 102 may be of any type of device that is able to have a network address assigned to it, such as mobile phones, implantable medical devices, automotive systems, thermostats, wearable devices, surveillance systems, household appliances, televisions, etc. Some of the network addressable devices 102 may be deployed for long-term deployment. For example, a solar-powered surveillance camera may have an expected lifetime of five to ten years. Other devices 102 may be consumer electronics that are replaced yearly, such as with mobile phones or tablets. Other devices 102 may be devices that include, or are connect to, control sensors.

In the embodiment illustrated in FIG. 1, the network addressable devices 102 are wirelessly connected to a base station 104, which is communicatively connected to a datacenter 106 via a network 108. The base station 104 may be used to communicate with other base stations, datacenters, additional networks, or other devices to extend the communication network for the network addressable devices. The base station 104 facilitates wireless communication between equipment and a network. Equipment may include any network addressable device 102, user equipment (e.g., mobile phone, WLL phone, or computer with wireless Internet connectivity), or the like. The wireless network connecting the equipment (e.g., device 102) with the base station 104 may be any type of wireless communication technology, such as GSM, CDMA, wireless local loop, Wi-Fi®, WiMAX®, or other local-area or wide-area network.

The network 108 includes any type of wired or wireless communication network or combinations of wired or wireless networks. Examples of communication networks include a local area network (LAN), a wide area network (WAN), the Internet, mobile telephone networks, plain old telephone (POTS) networks, and wireless data networks (e.g., Wi-Fi®, 3G, and 4G LTE/LTE-A or WiMAX® networks). The network 108 acts to backhaul the data to the core network (e.g., to the datacenter 106 or other destinations).

The data center 106 may be any type of computer system. The data center 106 may be used to operate and manage a carrier's telecommunication network, provide applications to customers, or provided hosted applications for third-party clients. The data center 106 may also be referred to as a server farm, server room, computer center, operations center, or the like. The data center 106 may provide mechanisms for disaster recovery, power and cooling, and security.

In the embodiment illustrated in FIG. 1, the network addressable devices 102 are all directly connected to the base station 104 via a wireless connection. The wireless connection may be a long-range, low-latency, high-data rate connection, such as IEEE 802.22. The devices 102 may be configured to use such a wireless connection based on a performance policy 112, which may be served from a policy server 110. Alternatively, the performance policy 112 may be installed by a technician or be installed at manufacture or production of the device 102. The performance policy 112 is used to provide the device 102 with one or more directives that are used to guide operation of the device 102. In the example shown in FIG. 1, the performance policy 112 provides that the devices 102 are to extend operation as long as possible (e.g., maximize battery life).

Figure 2:
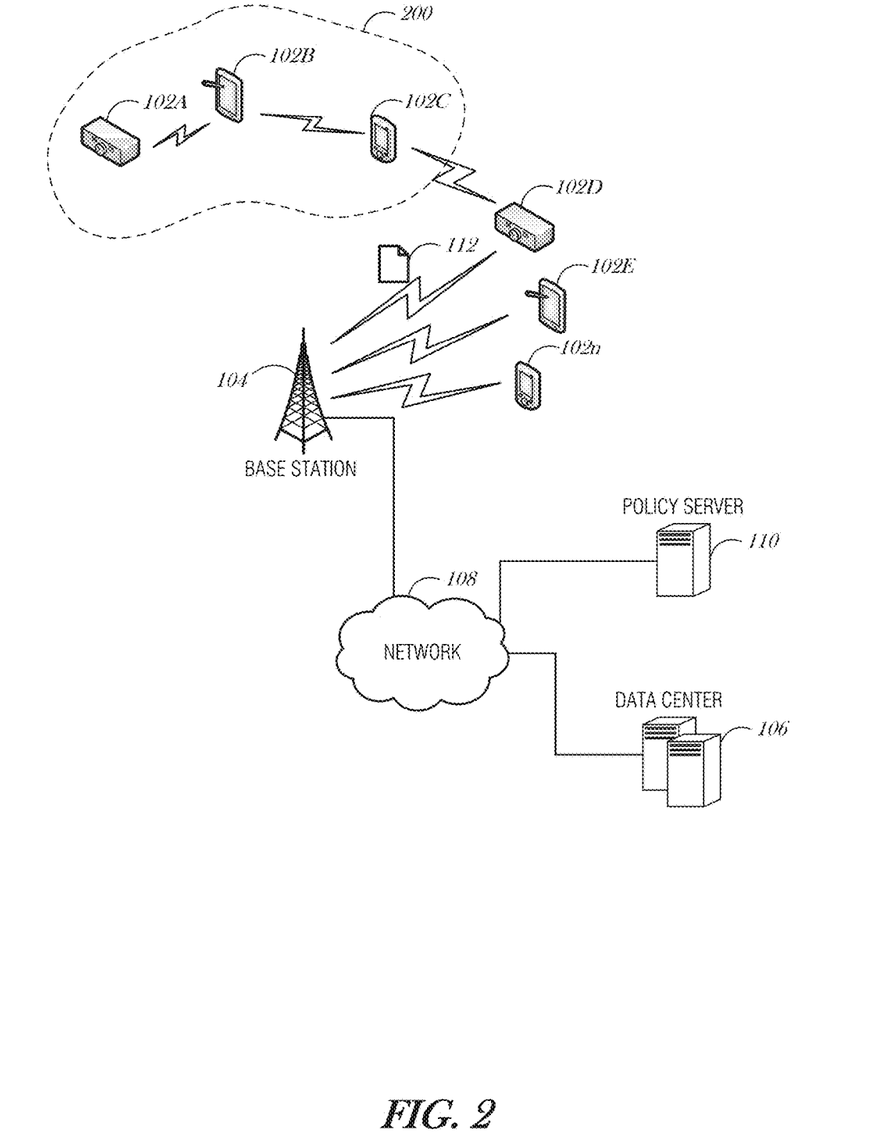
FIG. 2 is a schematic drawing illustrating the networked system at a later point in time, according to an embodiment.

FIG. 2 is a schematic drawing illustrating the networked system 100 at a later point in time, according to an embodiment. After a period of time, a subset of nodes 200 no longer have sufficient resources to maintain the high-capacity, long-range link protocol. Rather than ceasing operation, the subset of nodes 200 switch to a low duty cycle, low data capacity mesh network approach in order to maintain communications with the base state 104 and the core network (e.g., the data center 106).

Figure 3:
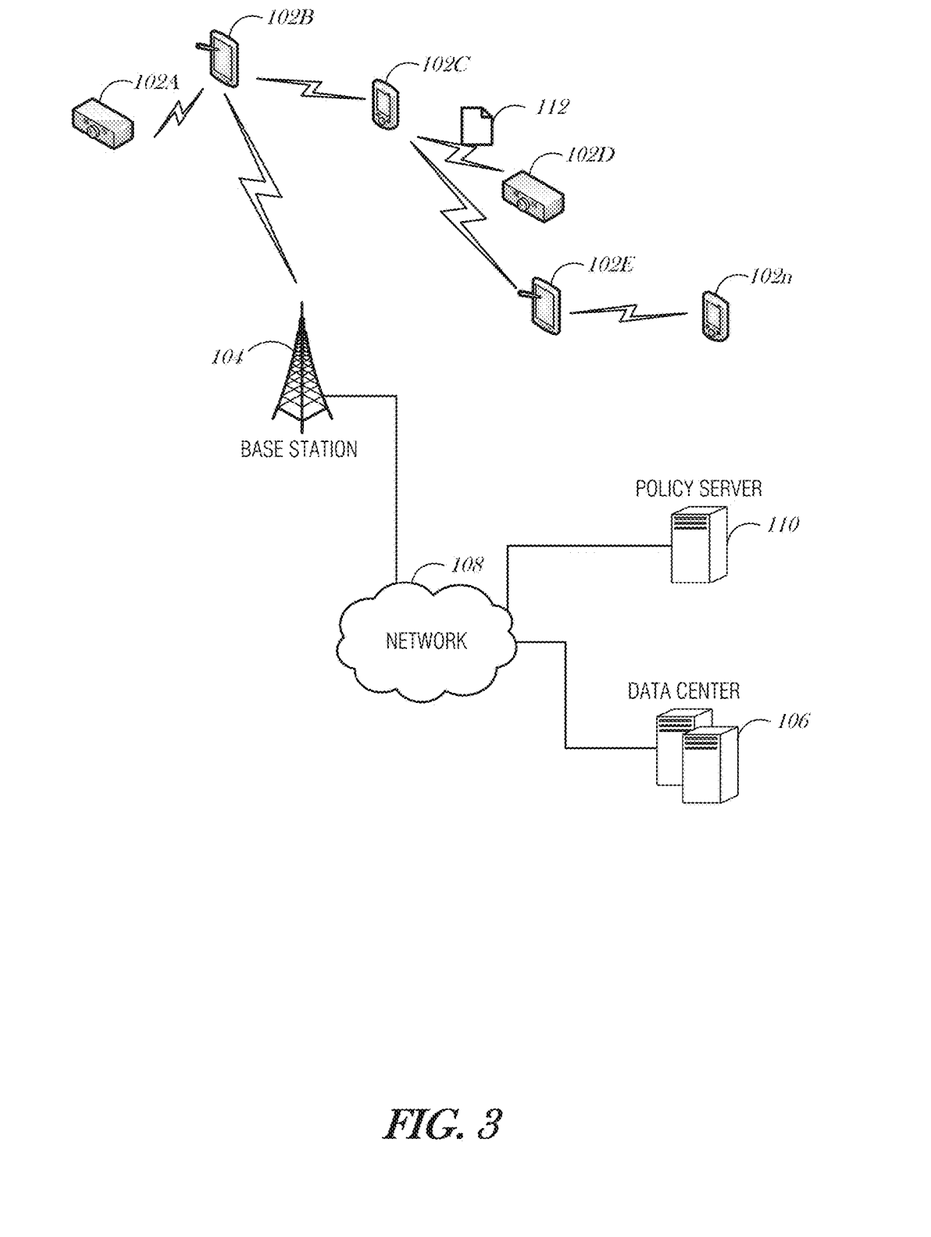
FIG. 3 is a schematic drawing illustrating the networked system 100 at a later point in time than that shown in FIG. 2, according to an embodiment.

FIG. 3 is a schematic drawing illustrating the networked system 100 at a later point in time than that shown in FIG. 2, according to an embodiment. Here, after more time has elapsed since the time of the state illustrated in FIG. 2, all of the nodes no longer have sufficient resources to maintain a long-range, high data rate link directly to the base station 106 or core network (e.g., the data center 106). In this case, the devices 102 gracefully degrade their network communications capabilities to use a mesh network approach and to route messages destined for the core network via the nearest node in the network. The operation of the devices 102 is controlled or influenced by the performance policy 112. In the scenario shown in FIGS. 1-3, the performance policy 112 provided the directive to maintain a communication link for as long as possible (e.g., maximize battery life). Other policies may be pushed from the policy server 110 or from a local administrator. For example, during a crisis, such as an earthquake or a terrorist attack, the performance policy 112 may provide the directive to maximize the amount of data throughput for some devices (e.g., cellular phones), while minimizing network traffic for other devices (e.g., thermostats), in order to provide communication bandwidth for first responders, families, etc. Policies may be designed to have various time periods, each with different directives. For example, a policy may have one directive during daytime and a different directive during nighttime. Similarly, a policy may have different directives for different days of the week, weeks of the year, certain days or hours, etc.

The devices 102 may be equipped with several network interfaces. In order to determine which interface to use according to the current policy in force, a device 102 may refer to a database of interfaces. The database of interfaces may be stored on the device 102 or remote from the device 102. The database of interfaces may include various specifications of each interface stored in the database, such as the theoretical maximum data rate of a particular interface, power consumption, and the like. The interfaces in the database may be ordered and stored either in the database or in a separate storage file. The order may be based on the current policy in force and the interfaces may be resorted when a new policy is activated. When one interface is to be disabled in favor of another interface due to a policy directive, the sorted list of interfaces may be referenced to determine the next interface to implement.

In general, a device 102 is able to monitor available resources in the device 102 and dynamically change the active network interface to best meet the objectives of the active policy. For example, a policy directive may configure a device 102 to maximize its operational lifetime by reducing the bandwidth, transmission power, or transmission duty cycle in order to help conserve power. As another example, the device 102 may be directed by a policy to maximize its data throughput (e.g., in response to an event requiring the full use of its communications abilities). Other policies may be designed and implemented.

Figure 4:
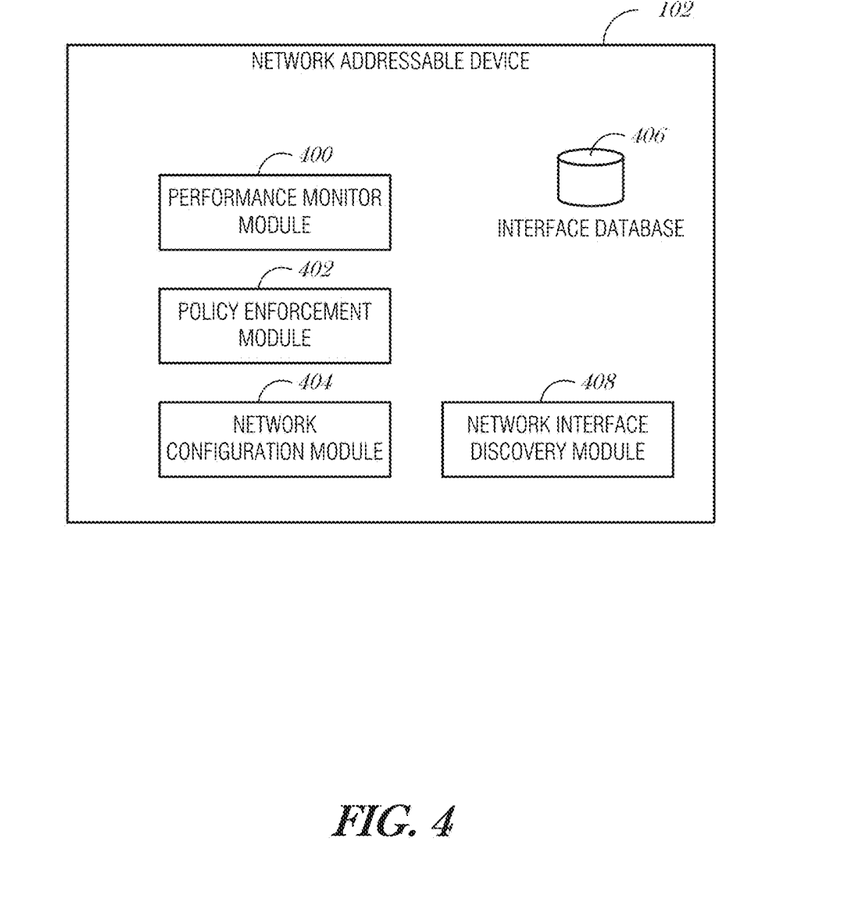
FIG. 4 is a block diagram illustrating a network addressable device, according to an embodiment.

FIG. 4 is a block diagram illustrating a network addressable device 102, according to an embodiment. The network addressable device 102 includes a performance monitor module 400, a policy enforcement module 402, and a network configuration module 404. The performance monitor module 400 is configured to monitor, at a computing device (e.g., device 102), performance of the computing device during a period while the computing device communicates on a network using a current network interface of the computing device. Various performance metrics may be monitored including, but not limited to, current battery power level, power usage over a period of time, estimated remaining battery life, network usage statistics (e.g., amount transmitted or received, latency, signal strength, etc.), or environmental factors (e.g., ambient temperature, time, solar strength, wind direction and strength, etc.).

The policy enforcement module 402 is configured to compare the performance of the computing device during the period with a performance policy installed on the computing device. The policy enforcement module 402 is also configured to determine that the performance violates a threshold, the threshold provided in the performance policy.

The network configuration module 404 is configured to reconfigure a network configuration in response to the determining that the performance violates the threshold by disabling the current network interface and enabling a replacement network interface from a plurality of network interfaces available on the computing device. In an embodiment, the policy enforcement module 402 maintains an ordered list of the plurality of network interfaces. As such, to reconfigure the network configuration, the network configuration module 404 is configured to identify a position in the ordered list of the plurality of network interfaces, traverse the ordered list of the plurality of network interfaces to identify the replacement network interface, and select the replacement network interface. For example, as power is consumed, an interface that has lower power requirements or less data rate may be selected. If more power is available (e.g., a solar panel has gathered additional power), then an interface may be selected that has more data rate or longer range.

The interfaces may be stored in various sort orders, as discussed above. In an embodiment, the ordered list is sorted from most power dissipation to least power dissipation. In this case, to traverse the ordered list, the network configuration module 404 is configured to identify the replacement network interface as being a network interface adjacent to the current network interface in the ordered list, the direction of adjacency determined by the performance policy. The ordered list of the plurality of network interfaces may be stored in an interface database 406.

Maintaining the ordered list may be performed based on the policy installed or to be installed. Thus, in an embodiment, the policy enforcement module 402 analyzes the performance policy to identify a primary directive and orders the plurality of network interfaces based on the primary directive. It is understood that the primary directive of a policy may be for any operational directive.

In an embodiment, the primary directive comprises maximizing operational lifetime of the computing device. In this case, ordering the plurality of network interfaces comprises ordering the plurality of network interfaces from interfaces with a higher power dissipation requirement to interfaces with a lower power dissipation requirement.

In another embodiment, the primary directive comprises maximizing network throughput. In this case, ordering the plurality of network interfaces comprises ordering the plurality of network interfaces from interfaces with a higher amount of potential data throughput to interfaces with a lower amount of potential data throughput.

Performance policies may also contain more than one directive. When more than one directive exists in a policy, the policy enforcement module 402 may analyze all of the directives when sorting the interfaces or selecting a particular interface to transition to or from. Thus, in an embodiment, the performance policy includes a secondary directive, and to maintain the ordered list, the policy enforcement module 402 is configured to order the plurality of network interfaces based on the primary and secondary directives.

The network addressable device 102 may also include a network interface discovery module 408 to discover the plurality of network interfaces available on the computing device. Such discovery may be performed periodically or at device start up or restart. Discovery may also be performed when a new interface is installed.

In an embodiment, the policy enforcement module 402 is configured to receive the performance policy from a remote device on the network. The performance policy may be served from a remote policy server, such as policy server 110 illustrated in FIG. 1. Alternatively, the performance policy may be installed by a local user or administrator. The performance policy may be transmitted from peer to peer or be obtained directly from a server. The performance policy may be encrypted or otherwise secured. Examples of encryption mechanisms include, but are not limited to, public-key infrastructure (PM) mechanisms (e.g., asymmetric cryptography), private key mechanisms (e.g., symmetric cryptography), and hashing mechanisms (e.g., Message Digest 5 (MD5) and Secure Hashing Algorithm (SHA)). Other specific mechanisms include Hypertext Transfer Protocol Secure (HTTPS) and Pretty Good Privacy (PGP). It is understood that other mechanisms to encrypt or secure communications may be used.

Figure 5:
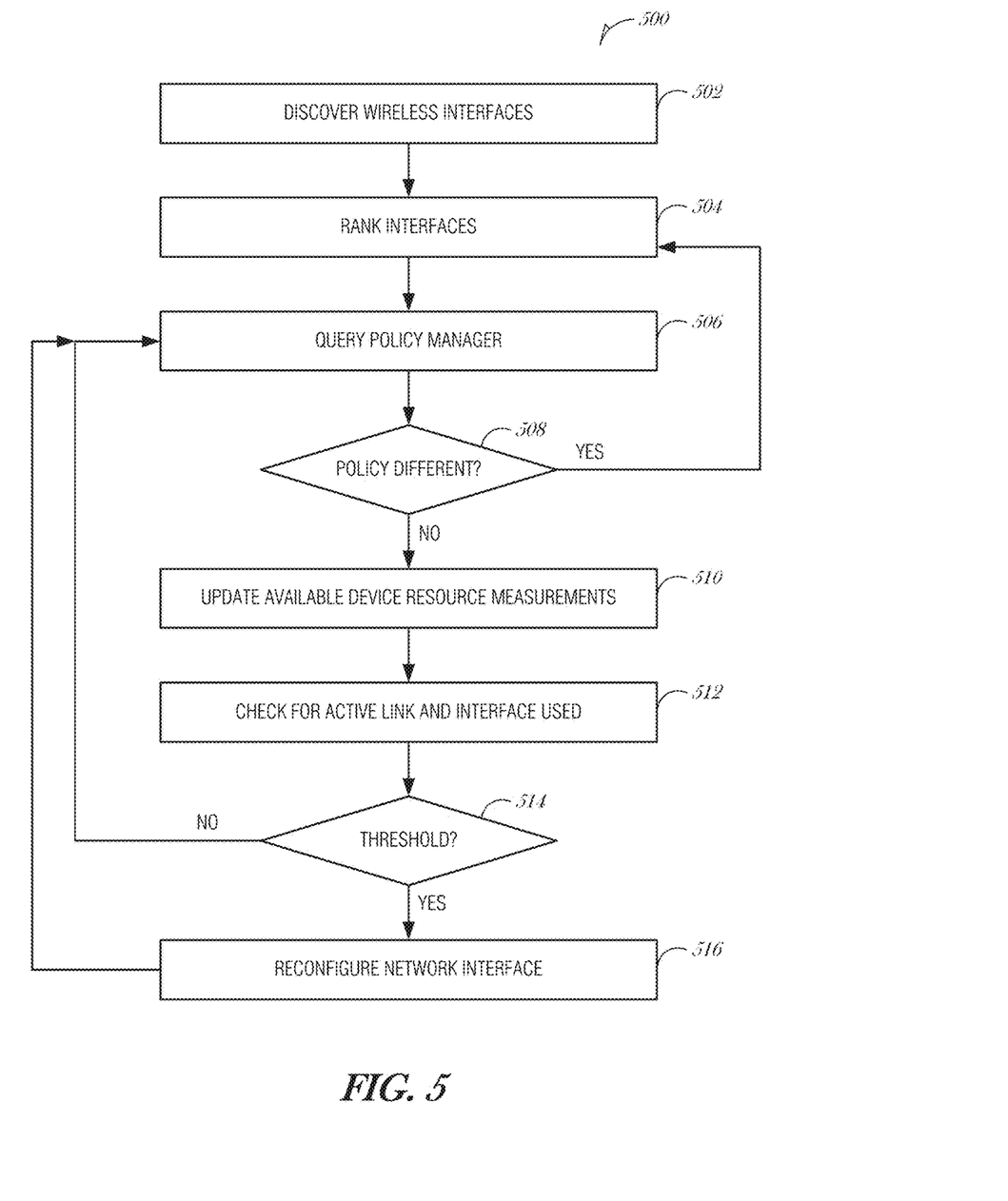
FIG. 5 is a flowchart illustrating a policy-driven process for managing devices, according to an embodiment.

FIG. 5 is a flowchart illustrating a policy-driven process 500 for managing devices, according to an embodiment. At block 502, wireless interfaces installed on the device are discovered. The wireless interfaces may be discovered using a system command, such as ipconfig or ifconfig. This information may be stored in an interface database on the device. The interface database may be a widely-used database, such as SQLite.

At block 504, the interfaces are ranked. The interfaces may be ranked in terms or device resource demands or suitability for intended wireless communication tasks. In order to rank interfaces, an interface database may be queried. The interface database may be populated with all available interfaces (e.g., all known interfaces), or limited to those interfaces that are installed or discovered on the device. The interface database may include actual performance specifications (e.g., observed or measured during a test or monitor period in a field test), or market specifications (e.g., design thresholds or capabilities). After the interface specifications or capabilities are identified, the interfaces are ranked according to a policy currently in force. The policy may be a default policy, such as one that is installed or configured at manufacture or deployment.

The list of interfaces may be sorted in terms of key resource characteristics or constraints, for example, their power dissipation requirements (e.g. transmission power, and/or transmission duty cycle), bandwidth, potential data throughput, and cost. The interface database is queried to retrieve interface characteristics and historical system performance metrics, such as for example, historical operational lifetime and power dissipation information. Current device resource capabilities are obtained, such as for example, current device power level information and communications requirements. Then, the network interfaces are ranked according to advertised requirements in terms of their suitability for the current device resource requirements, for example power level and communications requirements.

In an embodiment, available interfaces e.g. IEEE 802.11 Wi-Fi®, Ethernet, IEE 802.15.4, ZigBee®, Z-Wave®, cellular, Bluetooth®, IEEE 802.22, IEEE 802.11af, IEEE 802.11ac are retrieved from persistent storage such as for example a database. Historical information regarding the characteristics of the network interface and power dissipation profiles associated with each are also retrieved from the database. The remaining power level available to the device and the desired communications policy are obtained; the remaining power level is measured either using a low resolution ADC e.g. 4 or 8-bit ADC connected to the power source. The interfaces are then ranked in terms of the desired communications requirements and available power levels; other metrics may be used as part of this ranking process; it is not limited to power level alone. Examples of other metrics include duty-cycle, transmission power, frequency of operation and expected propagation range, network cost (as may be the case with cellular network operation), latency, and capacity. The interface ranking database is then updated following this procedure.

At block 506, a policy manager is queried. The policy manager is designed to store the current policy and work with other portions of the device to maintain and enforce the policy. The policy may be pushed to the device from a remote management service (e.g., a network or service operator). The policy manager may periodically check to determine whether a new policy is available to the device. Alternatively, the policy manager may receive a new policy, which may initiate the process 500.

In an embodiment, a policy manager may manage incoming policy updates from either a local on-device source or from a remote server. In an embodiment the policy updates can be managed locally on the device. In an alternative embodiment a device may publish metrics to a remote management server and the server may push policies and policy updates to the device. The policy manager provides an interface to allow the system to retrieve the operational objectives stated in the active policy, e.g., low duty cycle, minimum power dissipation, etc.

At decision block 508, if a new policy has been received or identified, which is to be used as a replacement to the current policy, then analysis is performed to determine whether the new policy is significantly different from the current policy. When a replacement policy is significantly different from the current policy, the process 500 moves to block 504 to re-rank the interfaces in view of the new policy's requirements. For example, if the current policy had a directive to conserve battery power to extend operational life, the network interfaces may be sorted based on power requirements. If a new policy instead has a directive to transmit as much data as possible for as long as possible, then the network interfaces may need to be resorted to rank them in terms of data throughput.

At block 510, the available device resources are updated. For example, the current available power is measured. The battery voltage may be converted to a digital value for use by the system using an analog to digital converter.

At block 512, the active link and interface is identified. A list of available network interfaces may be retrieved from the database. An active interface is identified by querying the interface state from the database. The state of an interface may be in active mode, however it may not be able to transmit or receive data due to a lack of backhaul capacity to the core network. An alternative method may be used in this system, which involves measuring the rate of change of transmitted and received bytes from active interfaces to determine the level of activity and then returning the name of the most active interface.

At decision block 514, the available device resources are compared against one or more thresholds. The thresholds may be derived from the combination of the device resource requirements and the operational policy (or policies) in place. If the available device resources are greater than the defined thresholds, then the device will return to a policy and resource monitoring loop (block 506). Alternatively, if the available device resources are less than the defined threshold, the process 500 will proceed to block 516 to reconfigure the network interface. Device resources may be battery power, signal strength, storage capacity, processor utilization, etc.

At block 516, the network interface is reconfigured. For example, the next ranked network interface is identified and activated and the current interface is deactivated. In an embodiment, the next best interface in terms of the rank order calculated in block 504 is identified and selected. The parameters associated with this identified interface are retrieved from the interface database. Then the selected interface is activated and the previously-used interface is deactivated.

For example, a replacement interface is identified by querying the database on the device to retrieve the name of the next best ranked interface. The configuration parameters that best suit the policy objective are also retrieved from the database. Using this information, the system then activates the requested interface e.g. ifconfig wlan0 up (in the case of a Wi-Fi interface example) and applies the configuration parameters e.g., transmission power level, channel of operation, frequency-hopping or single channel operation. Finally, the previously active interface is then deactivated to complete the process.

Advantageously the system may also detect if resource augmentation has occurred. For example, if a device has a mechanism for environmental energy harvesting, such as solar recharging capability, after having performed some recharging the power available to the device may be above the defined power resource threshold for the device to switch to using an interface that has higher power requirements. In this instance, the device may perform the analysis at decision block 514, but instead of degrading service, the system may augment service by switching to a network interface or protocol that has higher capabilities, for example, which supports greater network throughput, has less latency, or the like, but may require more resource consumption, such as having greater power requirements (e.g. a wireless interface supporting greater network throughput or the like but having higher power requirements).

Additionally, a device that is connected to sensors may report sensor readings and accompanying meta-data to a network based server, which may provide the appropriate policy. The system uses policy management to direct how the device should operate. In an embodiment, an operational objective is that the device should maximize its operational lifetime by reducing the bandwidth, transmission power, or transmission duty cycle in order to help conserve power. In another embodiment, the device is directed to maximize its data throughput in response to an event requiring the full use of its communications capabilities.

Figure 6:
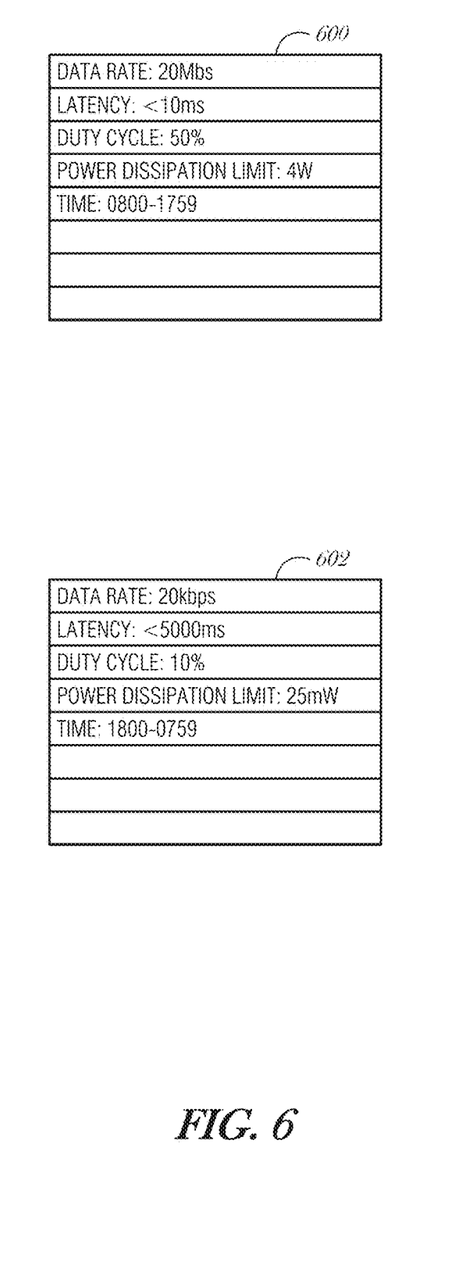
FIG. 6 illustrates two policies, according to an embodiment.

FIG. 6 illustrates two policies 600, 602, according to an embodiment. Policy 600 includes operational objectives required to support a high capacity, high power, low latency link during the hours of 8 am and 6 pm. In this case the system would select a suitable network interface in order to attempt to meet these requirements only if the available device resources can support this. An example of a suitable network interface in this case would be IEEE 802.22 (Standard for Cognitive Wireless Regional Area Networks (RAN) for Operation in TV Bands) or IEEE 802.11af (wireless computer networking standard in the 802.11 family, that allows wireless local area network (WLAN) operation in TV white space spectrum in the VHF and UHF bands between 54 and 790 MHz).

Policy 602 illustrates an alternative policy that requires the device to attempt to use a low duty-cycle, lower data rate link where low latency is not a critical requirement during the hours of 6 pm and 8 am. In this case, the device may choose to use IEEE 802.15.4/ZigBee® in order to meet the objectives.

Figure 7:
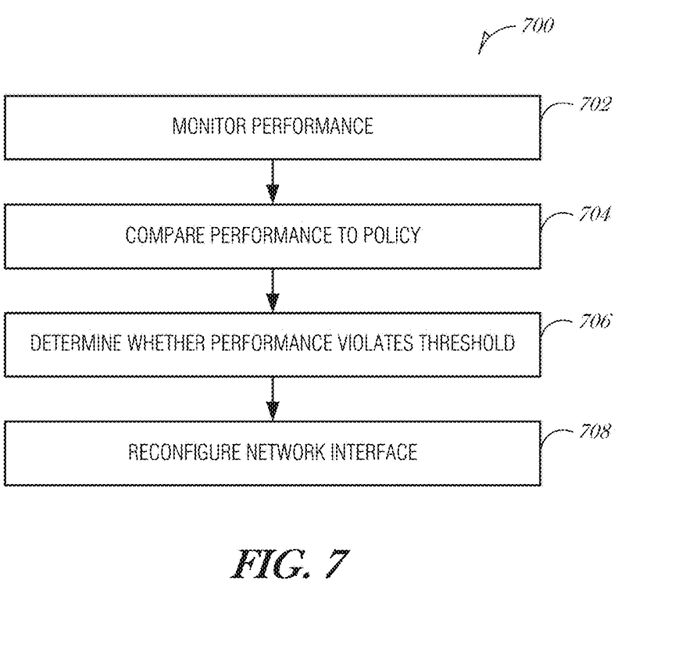
FIG. 7 is a flowchart illustrating a method 700 of automatic device configuration, according to an embodiment.

FIG. 7 is a flowchart illustrating a method 700 of automatic device configuration, according to an embodiment. At 702, performance of a computing device during a period while the computing device communicates on a network using a current network interface of the computing device is monitored.

At 704, the performance of the computing device during the period is compared with a performance policy installed on the computing device.

At 706, it is determined whether the performance violates a threshold, the threshold provided in the performance policy.

At 708, a network configuration is reconfigured in response to the determining that the performance violates the threshold, the reconfiguring performed by the computing device, and the reconfiguring of the network configuration includes disabling the current network interface and enabling a replacement network interface from a plurality of network interfaces available on the computing device.

In a further embodiment, the method 700 comprises discovering the plurality of network interfaces available on the computing device.

In a further embodiment, the method 700 comprises receiving the performance policy from a remote device on the network.

In a further embodiment, the method 700 comprises maintaining an ordered list of the plurality of network interfaces. In an embodiment, reconfiguring the network configuration comprises identifying a position in the ordered list of the plurality of network interfaces; traversing the ordered list of the plurality of network interfaces to identify the replacement network interface; and selecting the replacement network interface. In an embodiment, the ordered list is sorted from most power dissipation to least power dissipation, and traversing the ordered list comprises identifying the replacement network interface as being a network interface adjacent to the current network interface in the ordered list, the direction of adjacency determined by the performance policy.

In an embodiment, maintaining the ordered list comprises analyzing the performance policy to identify a primary directive, and ordering the plurality of network interfaces based on the primary directive. In an embodiment, the primary directive comprises maximizing operational lifetime of the computing device, and ordering the plurality of network interfaces comprises ordering the plurality of network interfaces from interfaces with a least amount of power dissipation requirement to interfaces with a most amount of power dissipation requirement.

In an embodiment, the primary directive comprises maximizing network throughput, and ordering the plurality of network interfaces comprises ordering the plurality of network interfaces from interfaces with a higher amount of potential data throughput to interfaces with a lower amount of potential data throughput.

In an embodiment, the performance policy includes a secondary directive, and maintaining the ordered list comprises ordering the plurality of network interfaces based on the primary and secondary directives. It is understood that there may be more than two directives.

In an embodiment, the ordered list of the plurality of network interfaces is stored in an interface database.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
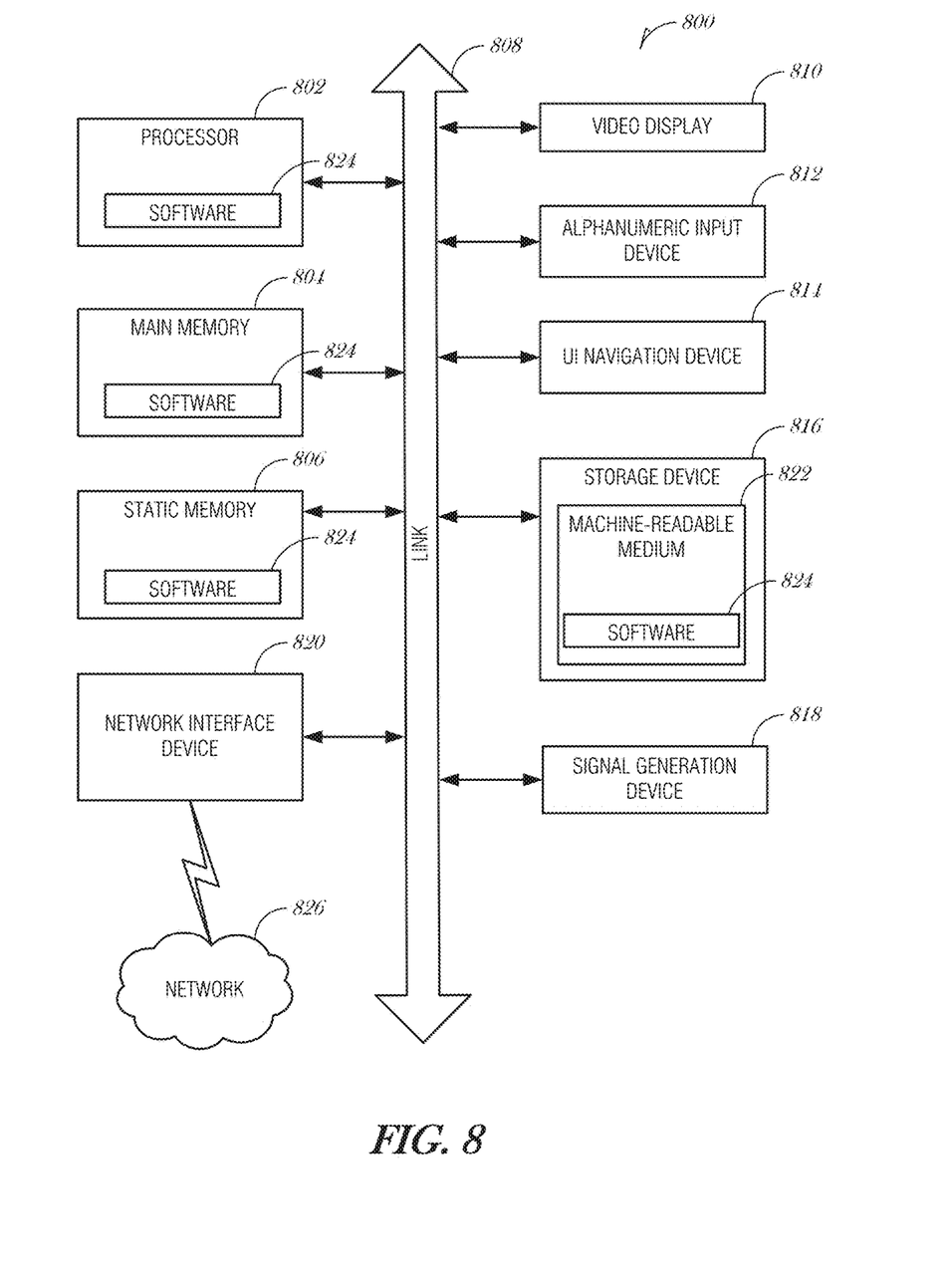
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi®, 3G, 4G LTE/LTE-A, 5G, WiMAX® networks, mesh networking (IEEE 802.15.4, ZigBee®, Z-Wave®), or long range networking (IEEE 802.22, WEIGHTLESS)). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for automatic device configuration (such as a device, apparatus, or machine) comprising a system for automatic device configuration, the system comprising: a performance monitor module to monitor, at a computing device, performance of the computing device during a period while the computing device communicates on a network using a current network interface of the computing device; a policy enforcement module to: compare the performance of the computing device during the period with a performance policy installed on the computing device; and determine that the performance violates a threshold, the threshold provided in the performance policy; and a network configuration module to: reconfigure a network configuration in response to the determining that the performance violates the threshold by disabling the current network interface and enabling a replacement network interface from a plurality of network interfaces available on the computing device.

In Example 2, the subject matter of Example 1 may include a network interface discovery module to discover the plurality of network interfaces available on the computing device.

In Example 3, the subject matter of any one or more of Examples 1 to 2 may include, wherein the policy enforcement module is further configured to: receive the performance policy from a remote device on the network.

In Example 4, the subject matter of any one or more of Examples 1 to 3 may include, wherein the policy enforcement module is further configured to: maintain an ordered list of the plurality of network interfaces.

In Example 5, the subject matter of any one or more of Examples 1 to 4 may include, wherein to reconfigure the network configuration, the network configuration module is configured to: identify a position in the ordered list of the plurality of network interfaces; traverse the ordered list of the plurality of network interfaces to identify the replacement network interface; and select the replacement network interface.

In Example 6, the subject matter of any one or more of Examples 1 to 5 may include, wherein the ordered list is sorted from most power dissipation to least power dissipation, and wherein to traverse the ordered list, the network configuration module is configured to: identify the replacement network interface as being a network interface adjacent to the current network interface in the ordered list, the direction of adjacency determined by the performance policy.

In Example 7, the subject matter of any one or more of Examples 1 to 6 may include, wherein to maintain the ordered list of the plurality of network interfaces, the policy enforcement module is configured to: analyze the performance policy to identify a primary directive; and order the plurality of network interfaces based on the primary directive.

In Example 8, the subject matter of any one or more of Examples 1 to 7 may include, wherein the primary directive comprises maximizing operational lifetime of the computing device, and wherein to order the plurality of network interfaces, the policy enforcement module orders the plurality of network interfaces from interfaces with a higher power dissipation requirement to interfaces with a lower power dissipation requirement.

In Example 9, the subject matter of any one or more of Examples 1 to 8 may include, wherein the primary directive comprises maximizing network throughput, and wherein ordering the plurality of network interfaces comprises ordering the plurality of network interfaces from interfaces with a higher amount of potential data throughput to interfaces with a lower amount of potential data throughput.

In Example 10, the subject matter of any one or more of Examples 1 to 9 may include, wherein the performance policy includes a secondary directive, and wherein to maintain the ordered list, the network configuration module is configured to order the plurality of network interfaces based on the primary and secondary directives.

In Example 11, the subject matter of any one or more of Examples 1 to 10 may include, wherein the ordered list of the plurality of network interfaces is stored in an interface database.

Example 12 includes subject matter for automatic device configuration (such as a method, means for performing acts, machine readable medium including instructions that when performed by a machine cause the machine to performs acts, or an apparatus configured to perform) comprising a method of automatic device configuration, the method comprising: monitoring, at a computing device, performance of the computing device during a period while the computing device communicates on a network using a current network interface of the computing device; comparing the performance of the computing device during the period with a performance policy installed on the computing device; determining that the performance violates a threshold, the threshold provided in the performance policy; and reconfiguring a network configuration in response to the determining that the performance violates the threshold, the reconfiguring performed by the computing device, and the reconfiguring the network configuration including disabling the current network interface and enabling a replacement network interface from a plurality of network interfaces available on the computing device.

In Example 13, the subject matter of Example 12 may include discovering the plurality of network interfaces available on the computing device.

In Example 14, the subject matter of any one or more of Examples 12 to 13 may include, receiving the performance policy from a remote device on the network.

In Example 15, the subject matter of any one or more of Examples 12 to 14 may include, maintaining an ordered list of the plurality of network interfaces.

In Example 16, the subject matter of any one or more of Examples 12 to 15 may include, wherein reconfiguring the network configuration comprises: identifying a position in the ordered list of the plurality of network interfaces; traversing the ordered list of the plurality of network interfaces to identify the replacement network interface; and selecting the replacement network interface.

In Example 17, the subject matter of any one or more of Examples 12 to 16 may include, wherein the ordered list is sorted from most power dissipation to least power dissipation, and wherein traversing the ordered list comprises: identifying the replacement network interface as being a network interface adjacent to the current network interface in the ordered list, the direction of adjacency determined by the performance policy.

In Example 18, the subject matter of any one or more of Examples 12 to 17 may include, wherein maintaining the ordered list comprises: analyzing the performance policy to identify a primary directive; and ordering the plurality of network interfaces based on the primary directive.

In Example 19, the subject matter of any one or more of Examples 12 to 18 may include, wherein the primary directive comprises maximizing operational lifetime of the computing device, and wherein ordering the plurality of network interfaces comprises ordering the plurality of network interfaces from interfaces with a higher power dissipation requirement to interfaces with a lower power dissipation requirement.

In Example 20, the subject matter of any one or more of Examples 12 to 19 may include, wherein the primary directive comprises maximizing network throughput, and wherein ordering the plurality of network interfaces comprises ordering the plurality of network interfaces from interfaces with a higher amount of potential data throughput to interfaces with a lower amount of potential data throughput.

In Example 21, the subject matter of any one or more of Examples 12 to 20 may include, wherein the performance policy includes a secondary directive, and wherein maintaining the ordered list comprises ordering the plurality of network interfaces based on the primary and secondary directives.

In Example 22, the subject matter of any one or more of Examples 12 to 21 may include, wherein the ordered list of the plurality of network interfaces is stored in an interface database.

Example 23 includes a machine-readable medium including instructions, which when executed by a machine, cause the machine to perform operations of any of the methods of Examples 12-22.

Example 24 includes an apparatus comprising means for performing any of the methods of Examples 12-22.

Example 25 includes an apparatus comprising: means for monitoring, at a computing device, performance of the computing device during a period while the computing device communicates on a network using a current network interface of the computing device; means for comparing the performance of the computing device during the period with a performance policy installed on the computing device; means for determining that the performance violates a threshold, the threshold provided in the performance policy; and means for reconfiguring a network configuration in response to the determining that the performance violates the threshold, the reconfiguring performed by the computing device, and the reconfiguring the network configuration including disabling the current network interface and enabling a replacement network interface from a plurality of network interfaces available on the computing device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for automatic device configuration, the system comprising:

a performance monitor module to monitor, at a computing device, performance of the computing device during a period while the computing device communicates on a network using a current network interface of the computing device;

a policy enforcement module to:

determine whether the performance of the computing device during the period conforms to a performance policy installed on the computing device, wherein the performance policy is used to select a network interface, the performance policy including a duty cycle parameter and a power dissipation limit parameter for selecting the network interface, wherein the determination compares a remaining power level available of the computing device to estimated power requirements based on the duty cycle parameter and the power dissipation limit parameter included in the performance policy, and wherein the power dissipation limit parameter defines a boundary for a power consumption rate over time for the network interface; and a network configuration module to:

select a replacement network interface from a plurality of network interfaces by comparing a duty cycle value and power dissipation value of each network interface in correspondence to the duty cycle parameter and the power dissipation limit parameter of the performance policy, the replacement network interface increasing performance according to the performance policy over the current network interface; and reconfigure a network configuration in response to the determination that the performance does not conform to the performance policy by disabling the current network interface and enabling the replacement network interface from the plurality of network interfaces available on the computing device.

2. The system of claim 1, wherein the policy enforcement module is further configured to:

maintain an ordered list of the plurality of network interfaces.

3. The system of claim 2, wherein to reconfigure the network configuration, the network configuration module is configured to:

identify a position in the ordered list of the plurality of network interfaces;

traverse the ordered list of the plurality of network interfaces to identify the replacement network interface; and select the replacement network interface.

4. The system of claim 3, wherein the ordered list is sorted from most power dissipation to least power dissipation, and wherein to traverse the ordered list, the network configuration module is configured to:
identify the replacement network interface as being a network interface adjacent to the current network interface in the ordered list, the direction of adjacency determined by the performance policy.

5. The system of claim 2, wherein to maintain the ordered list of the plurality of network interfaces, the policy enforcement module is configured to:
analyze the performance policy to identify a primary directive; and
order the plurality of network interfaces based on the primary directive.

6. The system of claim 5, wherein the primary directive comprises maximizing operational lifetime of the computing device, and wherein to order the plurality of network interfaces, the policy enforcement module orders the plurality of network interfaces from interfaces with a higher power dissipation requirement to interfaces with a lower power dissipation requirement.

7. The system of claim 5, wherein the primary directive comprises maximizing network throughput, and wherein ordering the plurality of network interfaces comprises ordering the plurality of network interfaces from interfaces with a higher amount of potential data throughput to interfaces with a lower amount of potential data throughput.

8. The system of claim 5, wherein the performance policy includes a secondary directive, and wherein to maintain the ordered list, the network configuration module is configured to order the plurality of network interfaces based on the primary and secondary directives.

9. The system of claim 2, wherein the ordered list of the plurality of network interfaces is stored in an interface database.

10. A method of automatic device configuration, the method comprising:
monitoring, at a computing device, performance of the computing device during a period while the computing device communicates on a network using a current network interface of the computing device;
determining whether the performance of the computing device during the period conforms to a performance policy installed on the computing device, wherein the performance policy is used to select a network interface, the performance policy including a duty cycle parameter and a power dissipation limit parameter for selecting the network interface, wherein the determination compares a remaining power level available of the computing device to estimated power requirements based on the duty cycle parameter and the power dissipation limit parameter included in the performance policy, and wherein the power dissipation limit parameter defines a boundary for a power consumption rate over time for the network interface;
selecting a replacement network interface from a plurality of network interfaces by comparing a duty cycle value and power dissipation value of each network interface in correspondence to the duty cycle parameter and the power dissipation limit parameter of the performance policy, the replacement network interface increasing performance according to the performance policy over the current network interface; and
reconfiguring a network configuration in response to the determination that the performance violates the threshold, the reconfiguring performed by the computing device, and the reconfiguring the network configuration including disabling the current network interface and enabling the replacement network interface from the plurality of network interfaces available on the computing device.

11. The method of claim 10, further comprising:
discovering the plurality of network interfaces available on the computing device.

12. The method of claim 10, further comprising:
receiving the performance policy from a remote device on the network.

13. The method of claim 10, further comprising:
maintaining an ordered list of the plurality of network interfaces.

14. The method of claim 13, wherein reconfiguring the network configuration comprises:
identifying a position in the ordered list of the plurality of network interfaces;
traversing the ordered list of the plurality of network interfaces to identify the replacement network interface; and
selecting the replacement network interface.

15. The method of claim 14, wherein the ordered list is sorted from most power dissipation to least power dissipation, and wherein traversing the ordered list comprises:
identifying the replacement network interface as being a network interface adjacent to the current network interface in the ordered list, the direction of adjacency determined by the performance policy.

16. The method of claim 13, wherein maintaining the ordered list comprises:
analyzing the performance policy to identify a primary directive; and
ordering the plurality of network interfaces based on the primary directive.

17. The method of claim 16, wherein the primary directive comprises maximizing operational lifetime of the computing device, and wherein ordering the plurality of network interfaces comprises ordering the plurality of network interfaces from interfaces with a higher power dissipation requirement to interfaces with a lower power dissipation requirement.

18. The method of claim 16, wherein the primary directive comprises maximizing network throughput, and wherein ordering the plurality of network interfaces comprises ordering the plurality of network interfaces from interfaces with a higher amount of potential data throughput to interfaces with a lower amount of potential data throughput.

19. The method of claim 16, wherein the performance policy includes a secondary directive, and wherein maintaining the ordered list comprises ordering the plurality of network interfaces based on the primary and secondary directives.

20. The method of claim 13, wherein the ordered list of the plurality of network interfaces is stored in an interface database.

21. A non-transitory machine-readable medium including instructions for automatic device configuration, which when executed by a machine, cause the machine to:
monitor, at a computing device, performance of the computing device during a period while the computing device communicates on a network using a current network interface of the computing device;
determine whether the performance of the computing device during the period conforms to a performance policy installed on the computing device, wherein the performance policy is used to select a network interface, the performance policy including a duty cycle parameter and a power dissipation limit parameter for selecting the network interface, wherein the determination compares a remaining power level available of the computing device to estimated power requirements based on the duty cycle parameter and the power dissipation limit parameter included in the performance policy, and wherein the power dissipation limit parameter defines a boundary for a power consumption rate over time for a network interface;

determine that the performance violates a threshold, the threshold provided in the performance policy;

select a replacement network interface from a plurality of network interfaces by comparing a duty cycle value and power dissipation value of each network interface in correspondence to the duty cycle parameter and the power dissipation limit parameter of the performance policy and the determination that the performance violates the threshold, the replacement network interface increasing performance according to the performance policy over the current network interface; and reconfigure a network configuration in response to the determination that the performance violates the threshold, the reconfiguring performed by the computing device, and the reconfiguring the network configuration including disabling the current network interface and enabling the replacement network interface from the plurality of network interfaces available on the computing device.

22. The system of claim 1, wherein the remaining power level available to the computing device increases over time and supports a network interface with higher capabilities than the current network interface, and wherein the network configuration module reconfigures the network configuration to use the replacement network interface, the replacement network interface having greater capabilities than the current network interface.

23. The method of claim 10, wherein the remaining power level available to the computing device increases over time and supports a network interface with higher capabilities than the current network interface, and wherein reconfiguring the network configuration to use the replacement network interface includes reconfiguring the network configuration by enabling the replacement network interface having greater capabilities than the current network interface.

* * * * *